United States Patent
Takahashi et al.

(10) Patent No.: US 12,390,964 B2
(45) Date of Patent: Aug. 19, 2025

(54) MOLD, DEGASSING TOOL, AND METHOD FOR PRODUCING RESIN FOAM

(71) Applicant: Archem Inc., Tokyo (JP)

(72) Inventors: Yoshiyuki Takahashi, Tokyo (JP); Taichi Itabashi, Tokyo (JP); Takayuki Mochizuki, Tokyo (JP); Kazuhiro Hasegawa, Tokyo (JP)

(73) Assignee: Archem Inc., Tokyo (JP)

( * ) Notice: Subject to any disclaimer, the term of this patent is extended or adjusted under 35 U.S.C. 154(b) by 41 days.

(21) Appl. No.: 18/254,663

(22) PCT Filed: May 12, 2021

(86) PCT No.: PCT/JP2021/018123
§ 371 (c)(1),
(2) Date: May 26, 2023

(87) PCT Pub. No.: WO2022/113399
PCT Pub. Date: Jun. 2, 2022

(65) Prior Publication Data
US 2023/0415386 A1   Dec. 28, 2023

(30) Foreign Application Priority Data

Nov. 27, 2020   (JP) ................................. 2020-197384

(51) Int. Cl.
*B29C 44/58*    (2006.01)
*B29K 105/04*   (2006.01)

(52) U.S. Cl.
CPC ........ *B29C 44/588* (2013.01); *B29K 2105/04* (2013.01)

(58) Field of Classification Search
CPC ........................... B29C 44/588; B29K 2105/04

USPC ............................................................ 264/51
See application file for complete search history.

(56) References Cited

U.S. PATENT DOCUMENTS 6,224,698 B1 *   5/2001   Endo ....................... B29C 33/42
                                                      156/196

FOREIGN PATENT DOCUMENTS

| JP | H0938750    | A  | 2/1997  |
|----|-------------|----|---------|
| JP | H11269505   | A  | 10/1999 |
| JP | 2004142349  | A  | 5/2004  |
| JP | 2004299084  | A  | 10/2004 |
| JP | 2004299090  | A  | 10/2004 |
| JP | 2007062106  | A  | 3/2007  |
| JP | 2015101053  | A  | 6/2015  |
| JP | 2015112764  | A  | 6/2015  |
| JP | 6622571     | B2 | 12/2019 |

(Continued)

OTHER PUBLICATIONS

May 30, 2023, International Preliminary Report on Patentability issued in the International Patent Application No. PCT/JP2021/018123.

(Continued)

*Primary Examiner* — Christina A Johnson
*Assistant Examiner* — Xue H Liu
(74) *Attorney, Agent, or Firm* — KENJA IP LAW PC

(57) ABSTRACT

A mold 200 is a mold for molding a foam body, the mold including: a mold body portion 260; and a degassing tool 270 attached to the mold body portion. The degassing tool is formed of porous metal, and a surface 270a of the degassing tool that is on a side of a cavity of the mold forms part of a molding surface S of the mold.

18 Claims, 13 Drawing Sheets

(56) References Cited

FOREIGN PATENT DOCUMENTS

| JP | 2019214142 A | 12/2019 |
|---|---|---|
| WO | 2005011901 A1 | 2/2005 |

OTHER PUBLICATIONS

Jul. 6, 2021, International Search Report issued in the International Patent Application No. PCT/JP2021/018123.
Jun. 18, 2025, search result of Office Action issued by the China National Intellectual Property Administration in the corresponding Chinese Patent Application No. 202180078908.2.

* cited by examiner

MOLD, DEGASSING TOOL, AND METHOD FOR PRODUCING RESIN FOAM

TECHNICAL FIELD

The present disclosure relates to a mold, a degassing tool, and a method of manufacturing a resin foam body.

The present application is based on and claims the benefit of priority from the Japanese Patent Application No. 2020-197384, filed on Nov. 27, 2020, the entire contents of which are incorporated hereby by reference.

BACKGROUND

Conventionally, there are molds for molding foam bodies that include a mold body portion and a degassing tool (for example, Patent Literature [PTL] 1).

CITATION LIST

Patent Literature

PTL 1: JP 6622571 B2

SUMMARY

Technical Problem

However, in conventional molds, maintenance of the degassing tool may be time-consuming.

It would be helpful to provide a mold, a degassing tool, and a method of manufacturing a resin foam body that can reduce the time required for maintenance of the degassing tool.

Solution to Problem

A mold according to the present disclosure is a mold for molding a foam body, the mold including:

a mold body portion; and a degassing tool attached to the mold body portion, wherein the degassing tool is formed of porous metal, and a surface of the degassing tool that is on a side of a cavity of the mold forms part of a molding surface of the mold.

A degassing tool according to the present disclosure is a degassing tool to be used in the mold, wherein the degassing tool is formed of porous metal, and a surface of the degassing tool that is on a side of a cavity of the mold forms part of a molding surface of the mold.

A method of manufacturing a resin foam body according to the present disclosure is a method of manufacturing a resin foam body using the mold, the method including a foam molding step of foam molding a resin foam body, by arranging a foamable resin material at a predetermined arrangement position in a cavity of the mold and closing the mold, wherein in the foam molding step, gas in the cavity is released to outside of the mold through the degassing tool.

Advantageous Effect

According to the present disclosure, a mold, a degassing tool, and a method of manufacturing a resin foam body that can reduce the time required for maintenance of the degassing tool can be provided.

DETAILED DESCRIPTION

Figure 1:
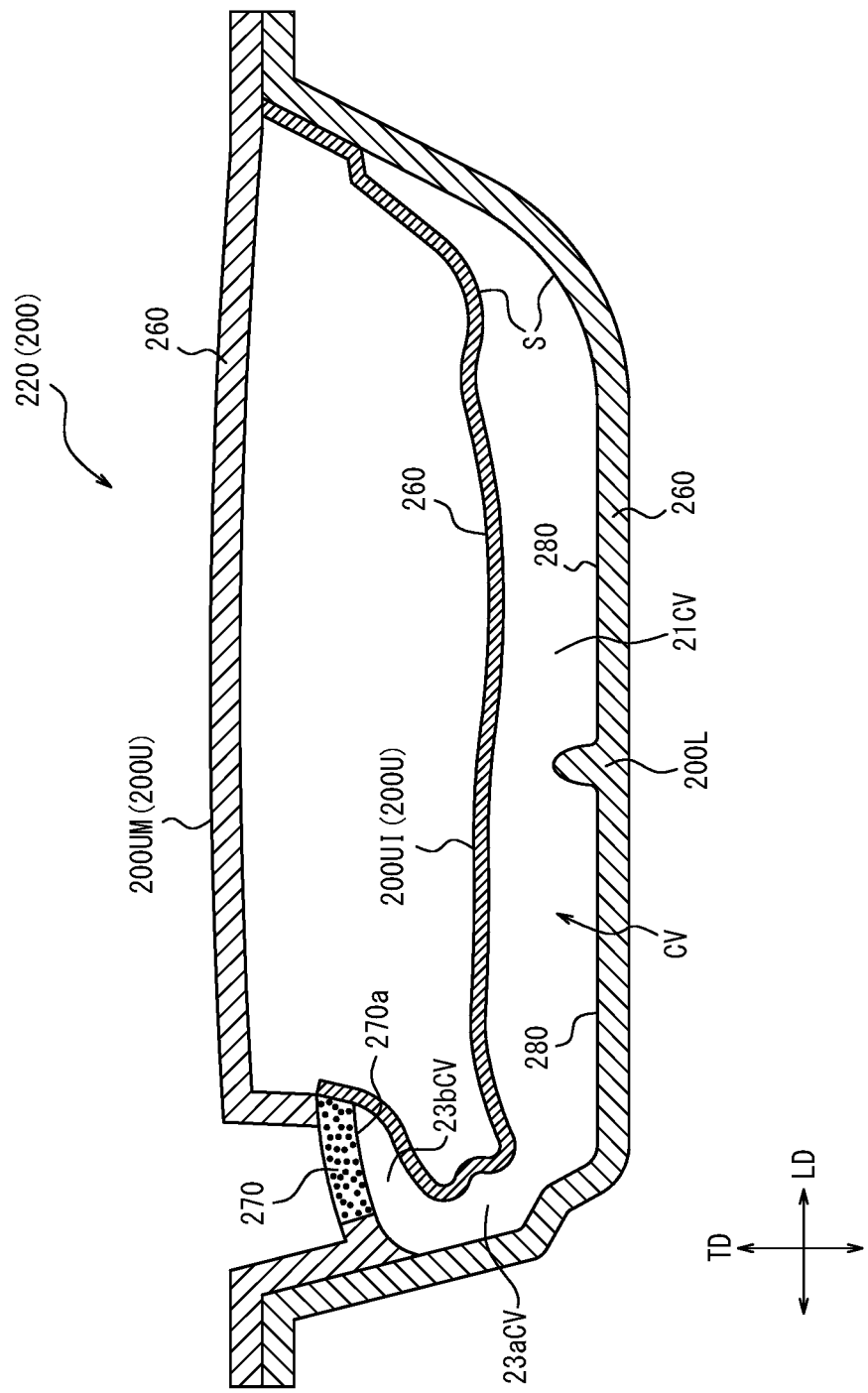
FIG. 1 is a cross-sectional view illustrating a mold according to a first embodiment of the present disclosure that is configured to mold a back pad of a seat pad along a direction of extension of the back pad.

A mold, a degassing tool, and a method of manufacturing a resin foam body according to the present disclosure are suitable for use in molding any resin foam body, and are more suitable for use in molding a resin foam body made of flexible resin. For example, they are suitable for use in molding a seat pad (especially, a vehicle seat pad). The "flexible resin" refers to resin that can deform when external force is applied, and for example, elastomer-based resin is preferred, and polyurethane is more preferred.

Embodiments of the mold, the degassing tool, and the method of manufacturing a resin foam body according to the present disclosure will be described by way of examples below with reference to the drawings.

In the drawings, the same components are denoted by the same reference numerals.

Figure 9:
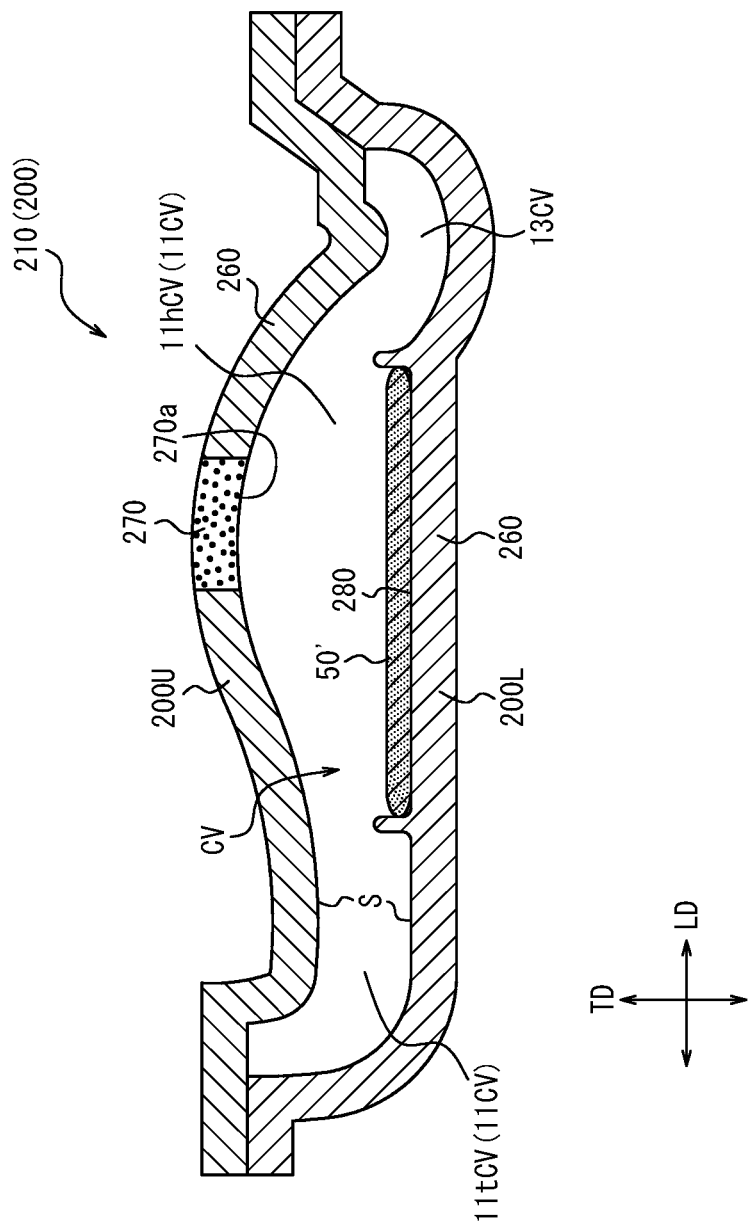
FIG. 9 is a cross-sectional view illustrating a mold according to a second embodiment of the present disclosure that is configured to mold a cushion pad of a seat pad along a direction of extension of the cushion pad, and it depicts a state immediately after a foamable resin material is arranged at a predetermined arrangement position and the mold is closed.
Figure 10:
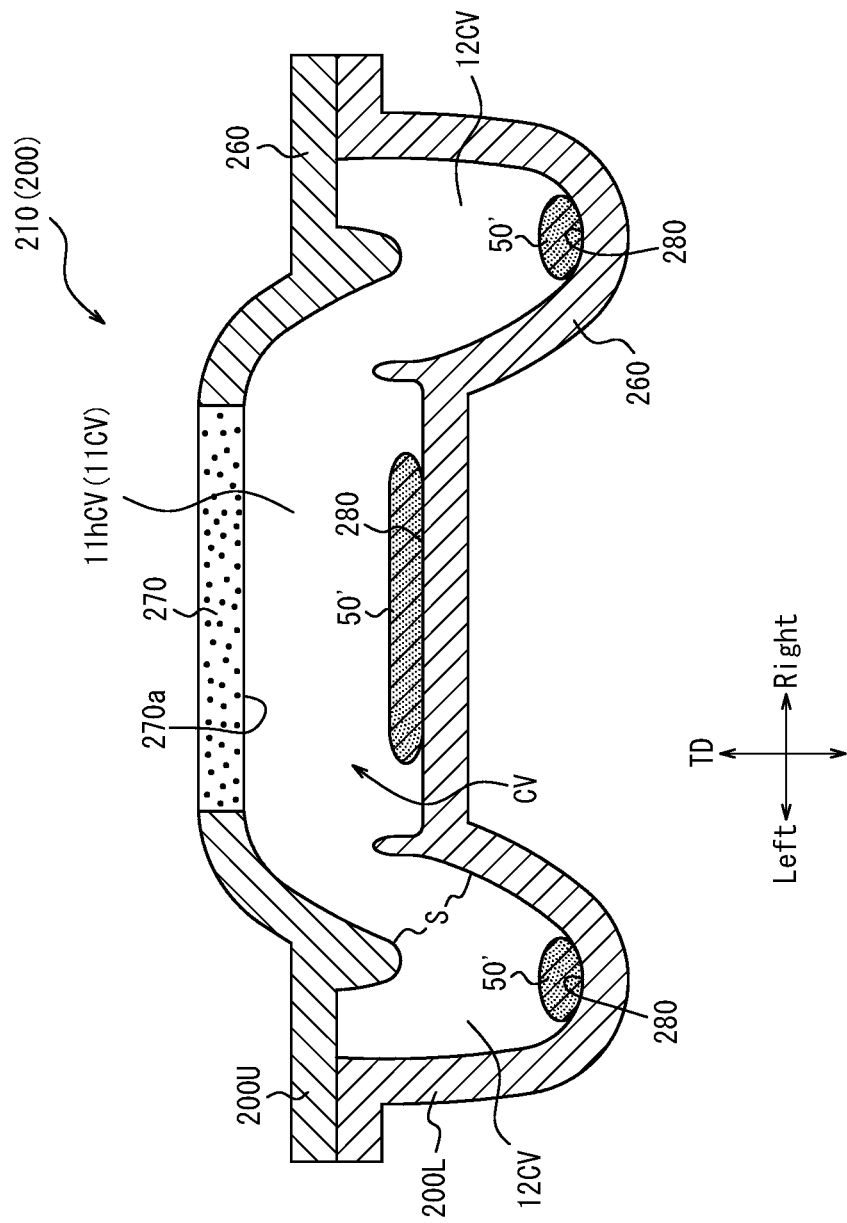
FIG. 10 is a cross-sectional view illustrating the mold of FIG. 9 along the left and right direction, and it depicts a state immediately after the foamable resin material is arranged at the predetermined arrangement position and the mold is closed.
Figure 11:
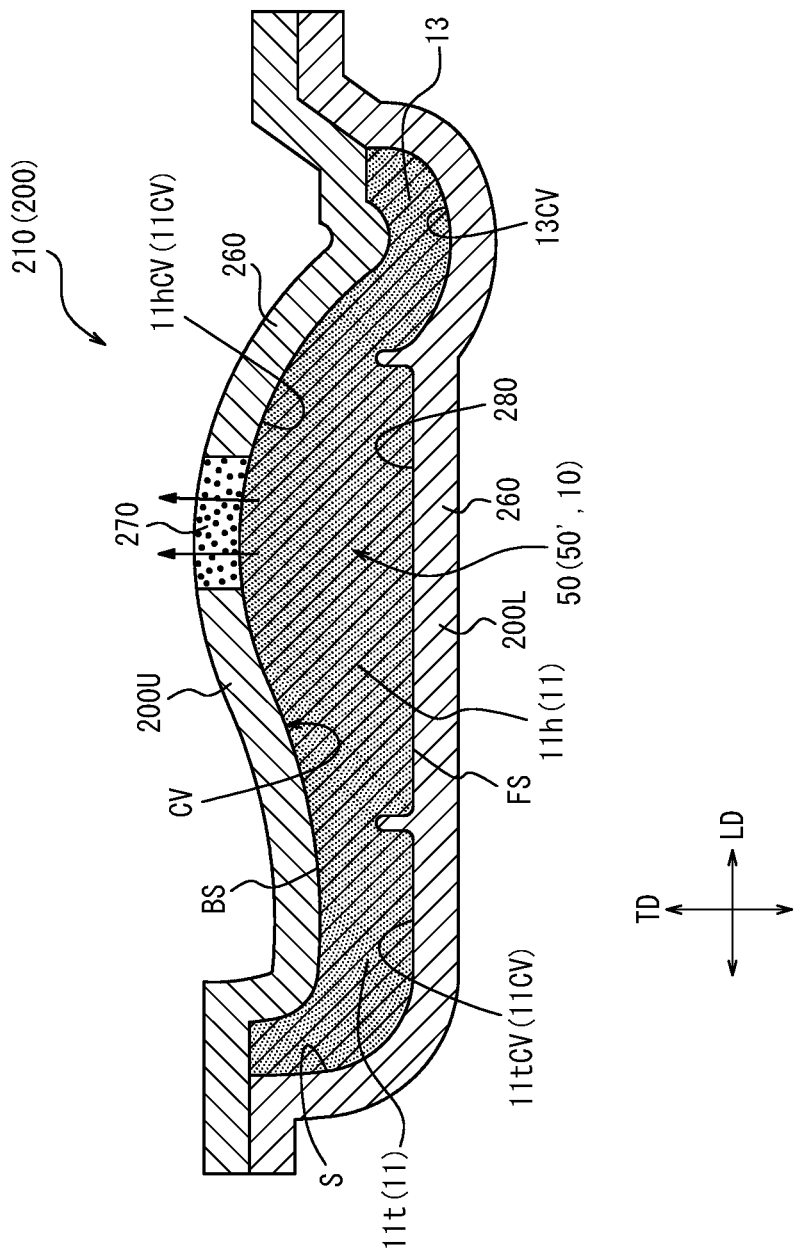
FIG. 11 illustrates a state in the mold of FIG. 9 in which a cavity has been filled with the foamable resin material.

FIG. 1 to FIG. 8 illustrate a mold 200 and a degassing tool 270 according to a first embodiment of the present disclosure. FIG. 9 to FIG. 11 illustrate a mold 200 and a degassing tool 270 according to a second embodiment of the present disclosure. For convenience of explanation, these embodiments will be described together below.

In each embodiment described herein, the mold 200 is a mold for foam molding, configured to mold a foam body (e.g., resin foam body).

In each embodiment described herein, the mold 200 includes a mold body portion 260 and at least one degassing tool 270. More specifically, the mold 200 consists of the mold body portion 260 and the at least one degassing tool 270. The mold body portion 260 corresponds to part of the mold 200 other than the at least one degassing tool 270.

The degassing tool 270 is attached to the mold body portion 260. More specifically, the degassing tool 270 is fitted into a hole provided in the mold body portion 260. Suitable methods of attaching the degassing tool 270 to the mold body portion 260 include fitting by adhesion and/or press-fitting.

The mold body portion 260 is formed of metal.

The degassing tool 270 is formed of porous metal. That is, the degassing tool 270 has a number of cell holes 272 and a skeleton portion 271 that defines these cell holes 272, as illustrated in an enlarged manner in FIG. 3. The cell holes 272 are voids. The skeleton portion 271 is formed of metal. The degassing tool 270 has an open-cell structure in which the cell holes 272 communicate with each other. The degassing tool 270 is configured to allow gas to pass through the cell holes 272, thereby allowing gas in a cavity CV to be released to the outside of the mold 200.

The mold 200 has a molding surface S configured to mold a foam body (e.g., resin foam body). The molding surface S defines the cavity CV.

A surface 270a of the degassing tool 270 that is on the side of the cavity CV forms part of the molding surface S of the mold 200, i.e., it faces the cavity CV.

Figure 12:
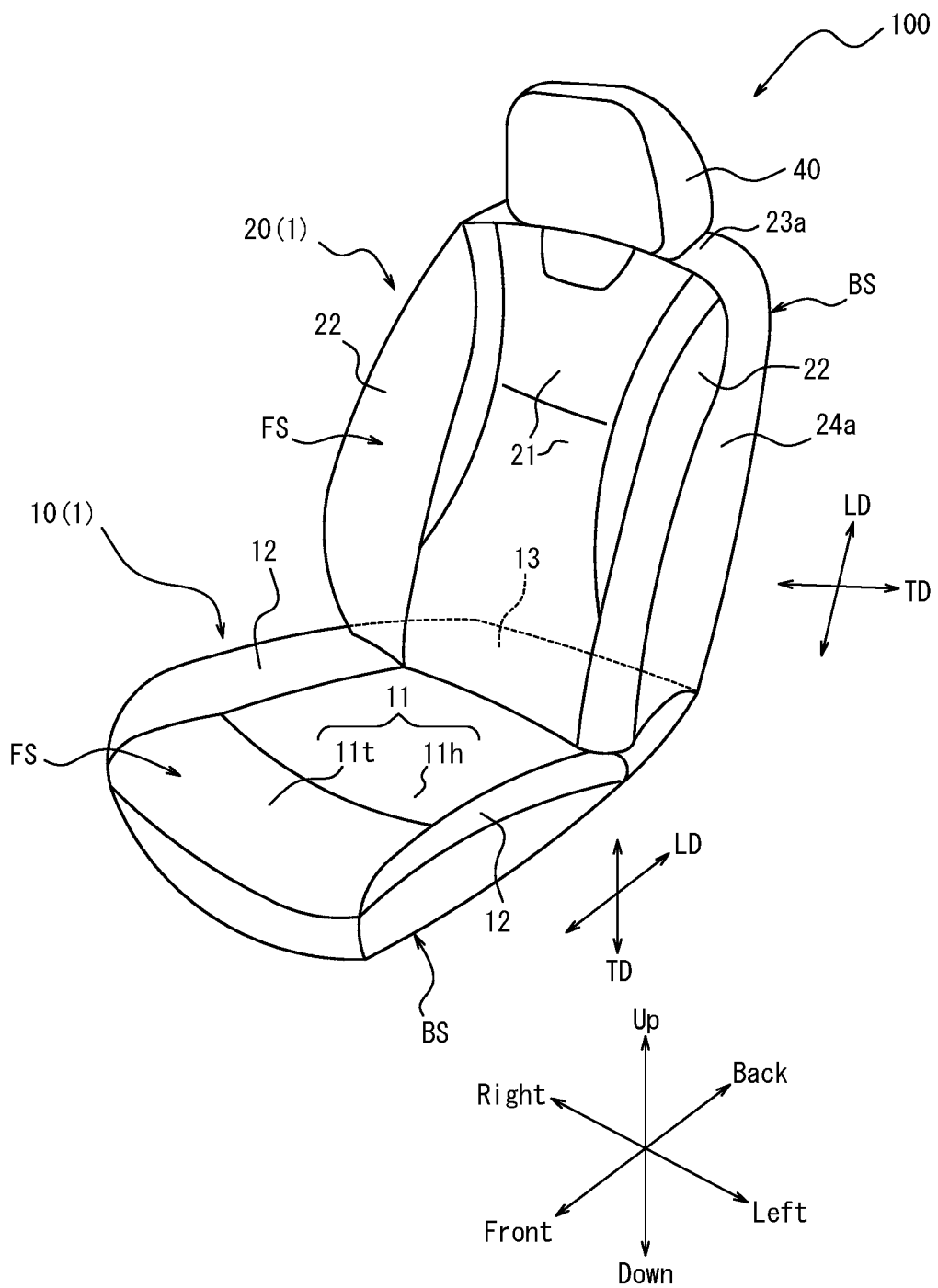
FIG. 12 is a perspective view illustrating an example of a vehicle seat including a seat pad.

The mold 200 may be configured to mold any resin foam body, and it is preferably configured to mold a resin foam body made of flexible resin. For example, it is preferably configured to mold a resin foam body made of polyurethane foam. The mold 200 may also be configured to mold a foam body for any application, and for example, it may be configured to mold a seat pad. The mold 200 of FIG. 1 to FIG. 8 according to the first embodiment is configured as a back pad molding mold 220, which is configured to mold a back pad 20 in a seat pad (i.e., vehicle seat pad) 1 to be used in a vehicle seat 100 as illustrated in FIG. 12. The mold 200 of FIG. 9 to FIG. 11 according to the second embodiment is configured as a cushion pad molding mold 210, which is configured to mold a cushion pad 10 in the seat pad (i.e., vehicle seat pad) 1 to be used in the vehicle seat 100 as illustrated in FIG. 12.

Now, the seat pad 1 will be described with reference to FIG. 12 and FIG. 13.

The seat pad 1 includes a cushion pad 10 for a seated person to sit on and a back pad 20 for supporting the back of the seated person. FIG. 13 illustrates the back pad 20 viewed from a back surface BS side. Each of the cushion pad 10 and the back pad 20 forms the seat pad 1. In the following, the cushion pad 10 or the back pad 20 may be referred to simply as the "seat pad 1." In addition to the seat pad 1, the vehicle seat 100 includes, for example, a skin (not illustrated) that covers a front side (seated person's side) of the seat pad 1, a frame (not illustrated) that supports the cushion pad 10 from below, a frame (not illustrated) installed on the back side of the back pad 20, and a headrest 40 installed on the upper side of the back pad so as to support the head of the seated person. The skin is formed of, for example, a breathable material (e.g., fabric). Although in the example of FIG. 1 the cushion pad 10 and the back pad 20 are configured as separate components, they may be configured as a single component.

Furthermore, although in the example of FIG. 12 the headrest 40 and the back pad 20 are configured as separate components, the headrest 40, together with the back pad 20, may be configured as a single component.

As illustrated in FIG. 12, the cushion pad 10 includes a main pad (also referred to as a "seated portion") 11 configured to support the hips and thighs of a seated person from below, a pair of side pads 12 that are positioned on both left and right sides of the main pad 11 and are configured to bulge upward from the main pad 11 so as to support the seated person from both the left and right sides, and a back pad facing portion 13 that is positioned behind the main pad 11 and that is configured to be arranged to face the back pad 20 in an up and down direction. The main pad 11 has an under-thigh portion 11t, which is configured to support the thighs of the seated person from below, and an under-hip portion 11h, which is positioned behind the under-thigh portion 11t and configured to support the hips of the seated person from below.

Figure 13:
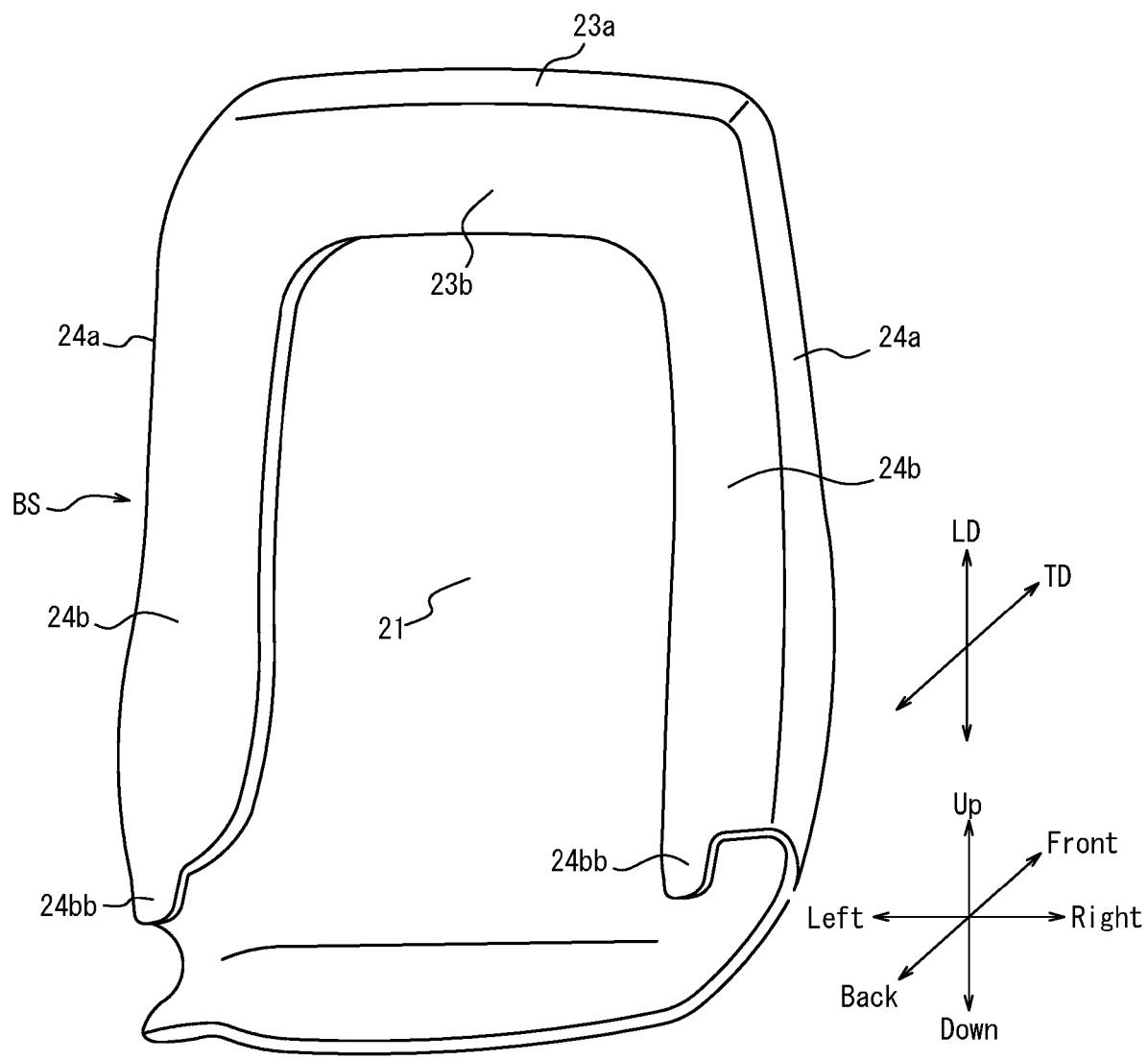
FIG. 13 is a perspective view illustrating a back pad of FIG. 12 from the back side.

As illustrated in FIG. 12 and FIG. 13, the back pad 20 includes a main pad 21 configured to support the back of the seated person from behind, a pair of side pads 22 that are positioned on both left and right sides of the main pad 21 and that are configured to bulge forward from the main pad 21 so as to support the seated person from both the left and right sides, an upper bridge portion 23a extending backward from an upper end of the main pad 21, an upper back portion 23b extending downward from a back end of the upper bridge portion 23a, a pair of side bridge portions 24a extending backward from outer ends in the left and right direction of the pair of side pads 22, and a pair of side back portions 24b extending inward in the left and right direction from back ends of the pair of side bridge portions 24a. The upper back portion 23b is spaced apart backward from the main pad 21. The upper bridge portion 23a connects the main pad 21 and the upper back portion 23b. The pair of side back portions 24b is spaced apart backward from the pair of side pads 22. The pair of side bridge portions 24a connects the pair of side pads 22 and the pair of side back portions 24b. Although not illustrated, a frame is fitted between the main pad 21 and the upper back portion 23b, and between the pair of side pads 22 and the pair of side back portions 24b.

Herein, the directions "up," "down," "left," "right," "front," and "back" as viewed from a seated person sitting on the vehicle seat 100 are simply referred to as, for example, "up," "down," "left," "right," "front," and "back," respectively.

Furthermore, herein, a "direction of extension (LD) of the seat pad 1" (hereinafter simply referred to as the "direction of extension [LD]") refers to a direction perpendicular to the left and right direction and a thickness direction (TD) of the seat pad 1. As illustrated in FIG. 12, in the case of the cushion pad 10, it refers to a front and back direction, and in the case of the back pad 20, it refers to a direction in which the main pad 21 of the back pad 20 extends from a lower surface to an upper surface of the main pad 21.

The "thickness direction (TD) of the seat pad 1" (hereinafter simply referred to as the "thickness direction [TD]") refers to the up and down direction in the case of the cushion pad 10, and in the case of the back pad it refers to a direction in which the main pad 21 of the back pad 20 extends from a surface on the seated person's side (front surface) FS to the back surface BS of the main pad 21, as illustrated in FIG. 12.

The "surface on the seated person's side (front surface or FS)" of the seat pad 1 refers to an upper surface in the case of the cushion pad 10, and it refers to a front surface in the case of the back pad 20. The "back surface (BS)" of the seat pad 1 refers to a lower surface in the case of the cushion pad 10, and it refers to a back surface in the case of the back pad 20.

Figure 2:
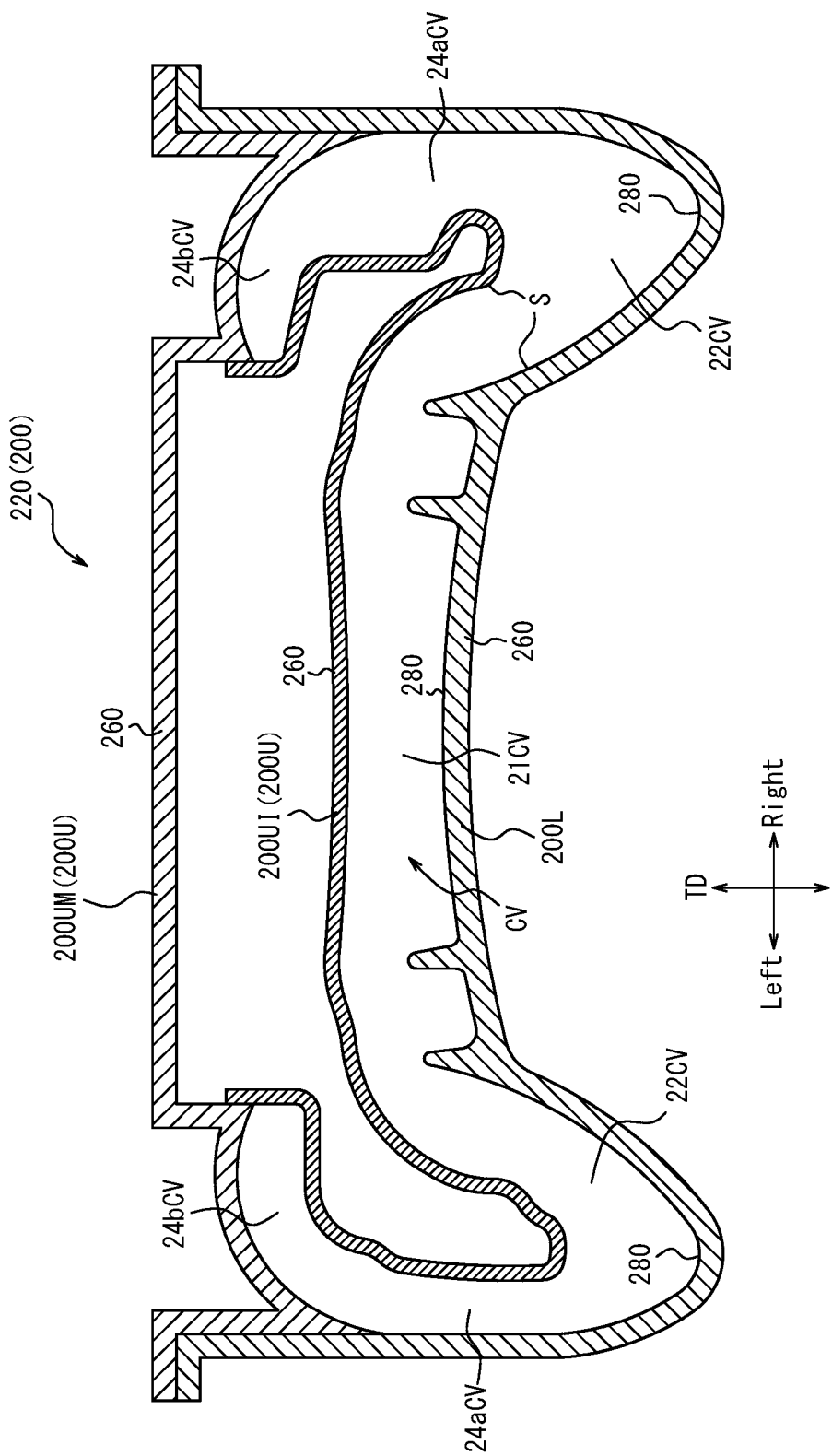
FIG. 2 is a cross-sectional view illustrating the mold of FIG. 1 along a left and right direction.
Figure 3:
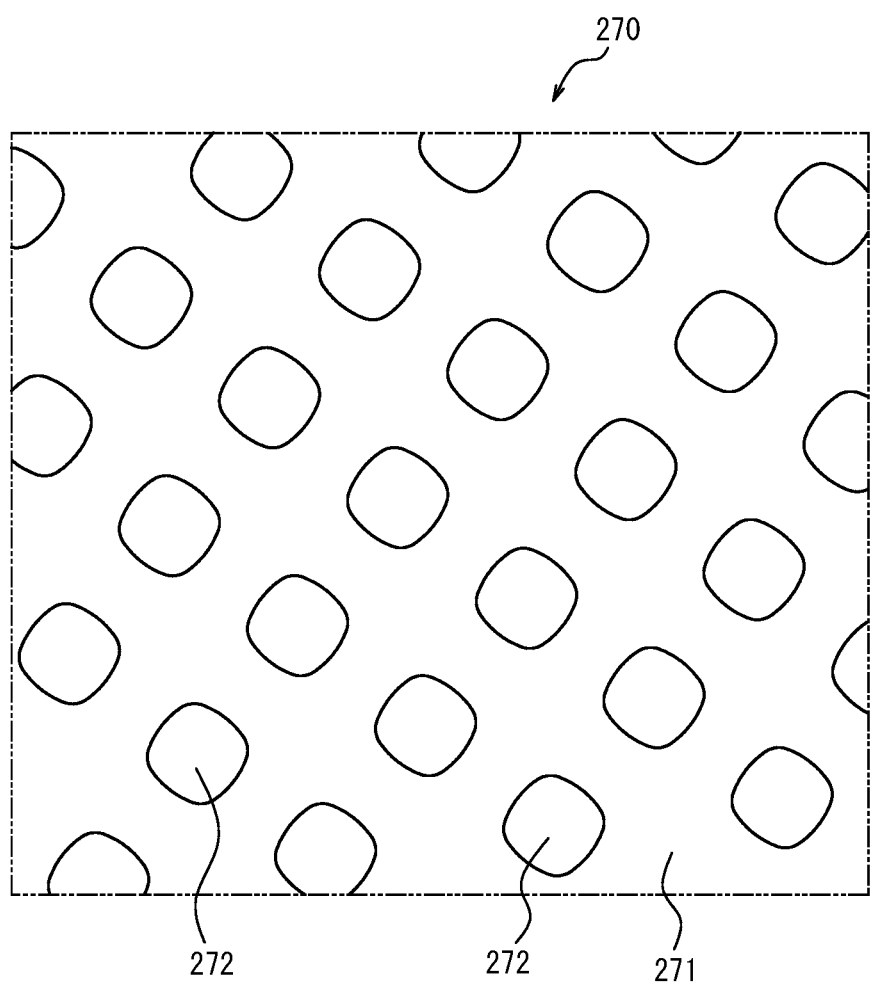
FIG. 3 is an enlarged view of part of a degassing tool of FIG. 1.

Next, with reference to FIG. 1, FIG. 2, and FIG. 8, the mold 200 according to the first embodiment of the present disclosure (i.e., back pad molding mold 220) will be described in more detail. As described above, the mold 200 according to the first embodiment is configured as the back pad molding mold 220, which is configured to mold the back pad 20 (FIG. 12). For convenience, in FIG. 1, FIG. 2, and FIG. 8, the direction of extension LD, the thickness direction TD, and the left and right direction in the back pad 20, which is a resin foam body 50 (FIG. 8) to be molded by the mold 200, are indicated by arrows. FIG. 1 is a cross-sectional view illustrating the mold 200 along the direction of extension LD of the back pad 20, and FIG. 2 is a cross-sectional view illustrating the mold 200 along the left and right direction of the back pad 20.

In the first embodiment, the mold 200 includes an upper mold 200U and a lower mold 200L arranged below the upper mold 200U. The upper mold 200U has an upper mold body portion 200UM and a core 200UI. As illustrated in FIG. 8, the molding surface S of the upper mold 200U is configured to mold part of the surface of the back pad 20 that includes the back surface BS. The molding surface S of the lower mold 200L is configured to mold part of the surface of the back pad 20 that includes the surface FS on the seated person's side. When the mold 200 is closed by joining the upper mold 200U and the lower mold 200L, the cavity CV is defined in the mold 200.

In the first embodiment, the cavity CV includes a main pad molding cavity 21CV (FIG. 1, FIG. 2, and FIG. 8) configured to mold the main pad 21, a pair of side pad molding cavities 22CV (FIG. 2) configured to mold the pair of side pads 22, an upper bridge portion molding cavity 23*a*CV (FIG. 1 and FIG. 8) configured to mold the upper bridge portion 23*a*, an upper back portion molding cavity 23*b*CV (FIG. 1 and FIG. 8) configured to mold the upper back portion 23*b*, a pair of side bridge portion molding cavities 24*a*CV (FIG. 2) configured to mold the pair of side bridge portions 24*a*, and a pair of side back portion molding cavities 24*b*CV (FIG. 2) configured to mold the pair of side back portions 24*b*.

In the first embodiment, the degassing tool 270 forms part of the upper mold 200U. The mold body portion 260 forms the upper mold 200U except for the above part and the lower mold 200L. More specifically, in the example illustrated in the figures, the degassing tool 270 forms at least part of a portion of the upper mold 200U (specifically, the upper mold body portion 200UM) that faces the upper back portion molding cavity 23*b*CV, as illustrated in FIG. 1. However, the degassing tool 270 may form any part of the mold 200 (the upper mold 200U and/or the lower mold 200L). For example, although not illustrated, it is preferable for another pair of degassing tools 270, in addition to the degassing tool 270 of FIG. 1, to form at least part of the portion of the upper mold 200U that faces the pair of side back portion molding cavities 24*b*CV (in particular, a portion thereof that faces part of the pair of side back portion molding cavities 24*b*CV configured to mold lower ends 24*bb* [FIG. 13] of the side back portions 24*b*). The degassing tool 270 may also from part of the lower mold 200L.

Next, with reference to FIG. 9 to FIG. 11, a configuration of the mold 200 according to the second embodiment of the present disclosure will be described. As described above, in the second embodiment, the mold 200 is configured as the cushion pad molding mold 210, which is configured to mold the cushion pad 10 (FIG. 12). For convenience, in FIG. 9 to FIG. 11, the direction of extension LD, the thickness direction TD, and the left and right direction in the cushion pad 10, which is a resin foam body 50 (FIG. 11) to be molded by the mold 200, are indicated by arrows. FIG. 9 is a cross-sectional view illustrating the mold 200 along the direction of extension LD of the cushion pad 10, and FIG. 10 is a cross-sectional view illustrating the mold 200 along the left and right direction of the cushion pad 10.

In the second embodiment, the mold 200 includes an upper mold 200U and a lower mold 200L arranged below the upper mold 200U. As illustrated in FIG. 11, the molding surface S of the upper mold 200U is configured to mold part of the surface of the cushion pad 10 that includes the back surface BS. The molding surface S of the lower mold 200L is configured to mold part of the surface of the cushion pad 10 that includes the surface FS on the seated person's side. When the mold 200 is closed by joining the upper mold 200U and the lower mold 200L, the cavity CV is defined in the mold 200.

In the second embodiment, the cavity CV includes a main pad molding cavity 11CV (FIG. 9 to FIG. 11) configured to mold the main pad 11, a pair of side pad molding cavities 12CV (FIG. 10) configured to mold the pair of side pads 12, and a back pad facing portion molding cavity 13CV (FIG. 10) configured to mold the back pad facing portion 13. The main pad molding cavity 11CV has an under-thigh portion molding cavity 11*t*CV (FIG. 9 and FIG. 11) configured to mold the under-thigh portion 11*t*, and an under-hip portion molding cavity 11*h*CV (FIG. 9 to FIG. 11) configured to mold the under-hip portion 11*h*.

In the second embodiment, the degassing tool 270 forms part of the upper mold 200U. The mold body portion 260 forms the upper mold 200U except for the above part and the lower mold 200L. More specifically, in the example illustrated in the figures, the degassing tool 270 forms at least part of a portion of the upper mold 200U that faces the under-hip portion molding cavity 11*h*CV. However, the degassing tool 270 may form any part in the mold 200. For example, the degassing tool 270 may form part of the lower mold 200L.

Next, with reference to FIG. 4 to FIG. 8, the method of manufacturing a resin foam body according to an embodiment of the present disclosure will be described. Although FIG. 4 to FIG. 8 illustrate a case in which the mold 200 (and thus, the back pack molding mold 220) according to the first embodiment of the present disclosure described above is used, the method of manufacturing a resin foam body according to the present embodiment can be implemented in the same manner using the mold 200 according to any embodiment of the present disclosure.

The method of manufacturing a resin foam body according to the present embodiment includes a mold release agent application step and a foam molding step.

First, in the mold release agent application step, a mold release agent 60 is applied to the molding surface S of the mold 200. The mold release agent application step is performed before the foam molding step.

The mold release agent 60 is preferably applied to the entire molding surface S of the mold 200, but it may be applied to only part of the molding surface S.

Figure 4:
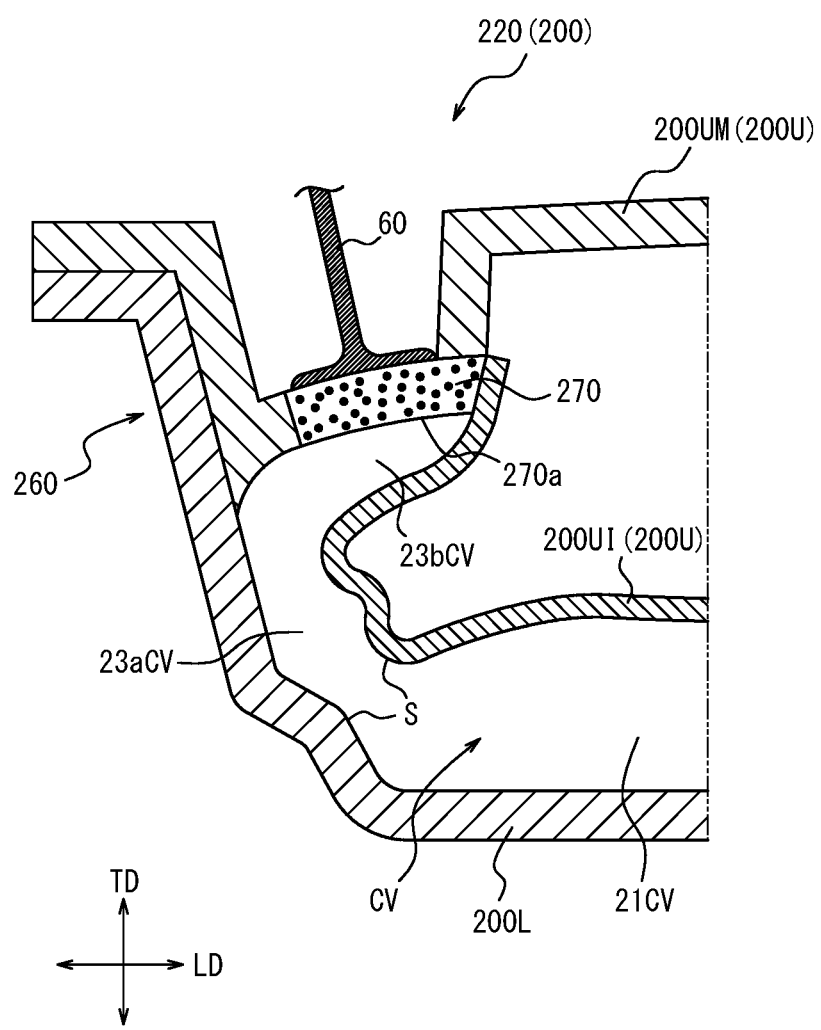
FIG. 4 illustrates a mold release agent application step in a method of manufacturing a resin foam body according to an embodiment of the present disclosure, and it depicts a state in the mold of FIG. 1 in which the mold release agent is applied to a degassing tool from the outside.
Figure 5:
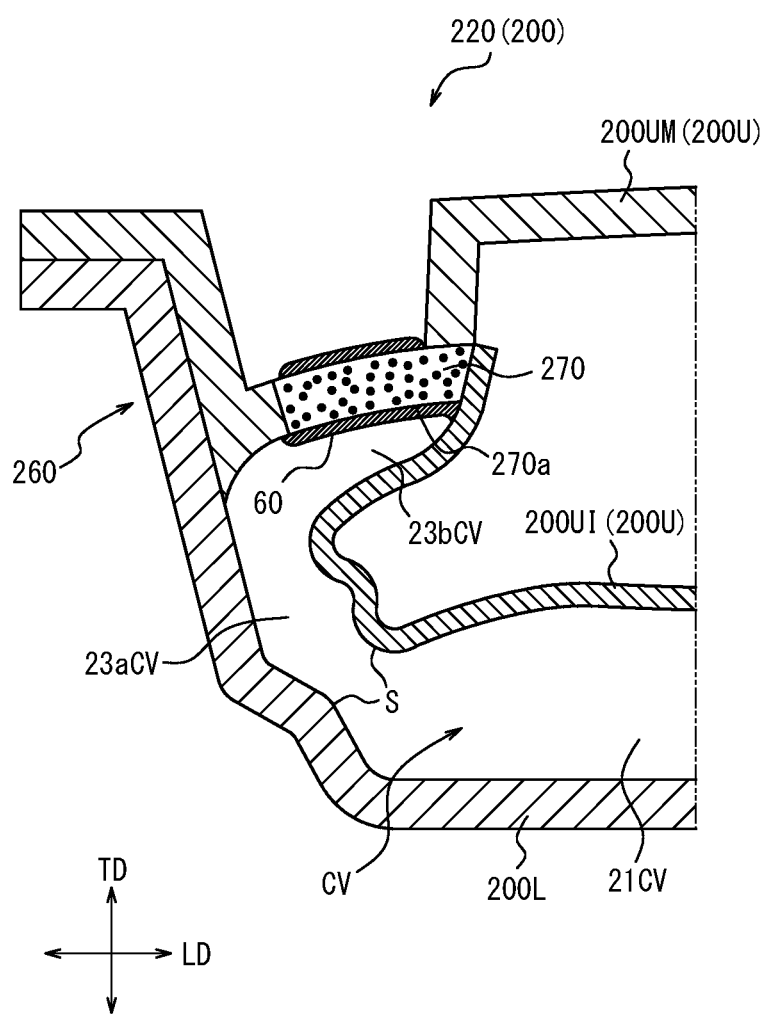
FIG. 5 illustrates the mold release agent application step in the method of manufacturing a resin foam body according to the embodiment of the present disclosure, and it depicts a state in the mold of FIG. 1 in which the mold release agent has reached a surface of the degassing tool that is on the side of a cavity.

In the mold release agent application step, preferably, the mold release agent 60 is also applied to the surface 270a of the degassing tool 270 that is on the side of the cavity CV and that forms part of the molding surface S. In this case, as illustrated in FIG. 4 and FIG. 5, the mold release agent 60 may be applied to the surface 270a of the degassing tool 270 that is on the side of the cavity CV, by allowing the mold release agent 60 to permeate the degassing tool 70 from outside the mold 200 and reach the surface 270a of the degassing tool 70 that is on the side of the cavity CV. This allows easy application of the mold release agent 60 to the surface 270a of the degassing tool 270 that is on the side of the cavity CV, even when the surface 270a of the degassing tool 270 that is on the side of the cavity CV is located where it is difficult to apply the mold release agent 60 from the cavity CV side, as in the examples in FIG. 4 and FIG. 5. FIG. 4 illustrates a state in which the mold release agent is applied to the degassing tool from the outside. FIG. 5 illustrates a state in which the mold release agent 60 has reached the surface 270a of the degassing tool 270 that is on the side of the cavity CV. The mold release agent 60 may, however, be applied to the surface 270a of the degassing tool 270 that is on the side of the cavity CV from the cavity CV side.

It is, however, not essential to apply the mold release agent 60 to the surface 270a of the degassing tool 270 that is on the side of the cavity CV in the mold release agent application step.

The mold release agent is, for example, a solvent-based agent.

Figure 6:
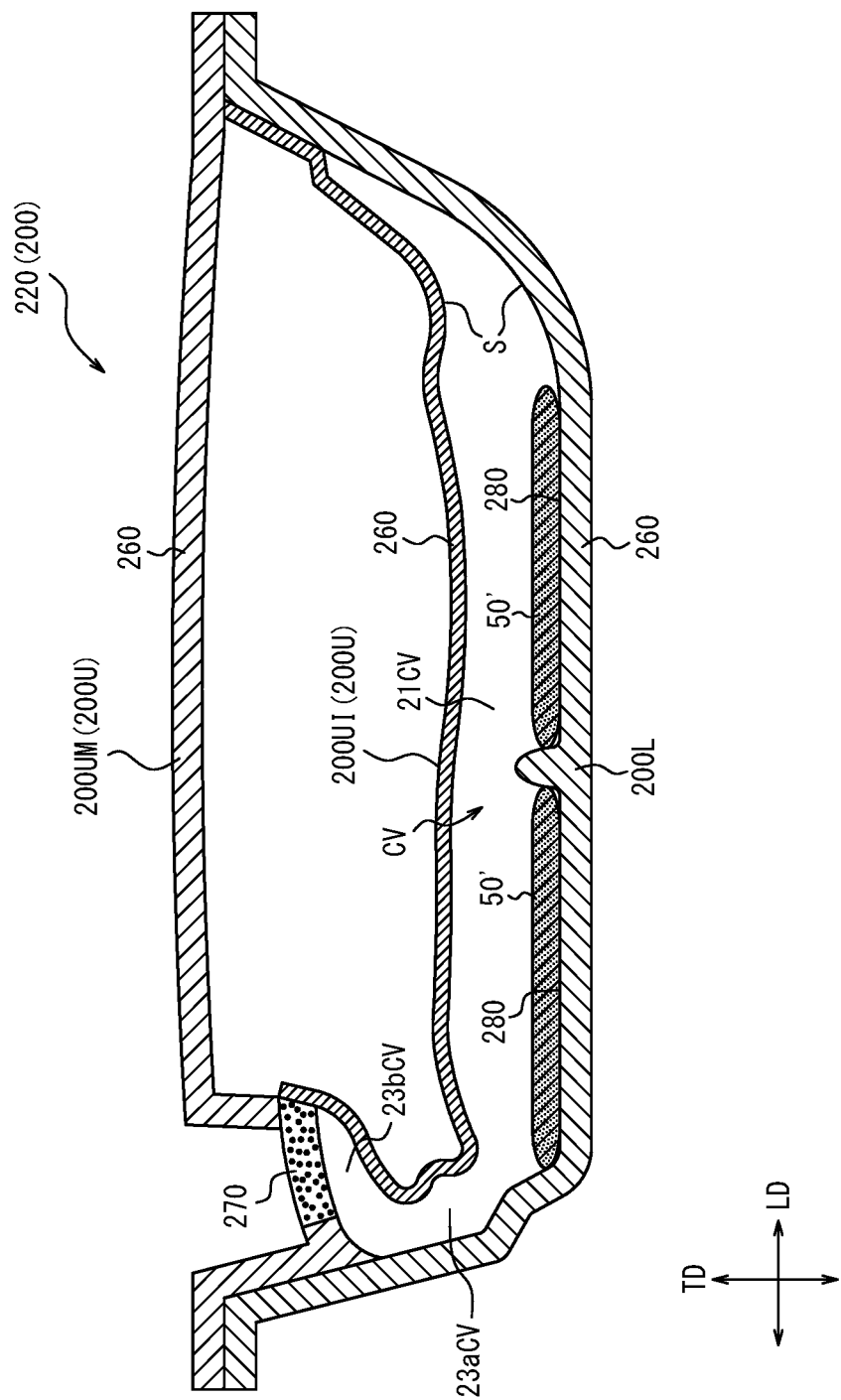
FIG. 6 illustrates a foam molding step in the method of manufacturing a resin foam body according to the embodiment of the present disclosure, and it depicts a state in the mold of FIG. 1 immediately after a foamable resin material is arranged at a predetermined arrangement position and the mold is closed.
Figure 7:
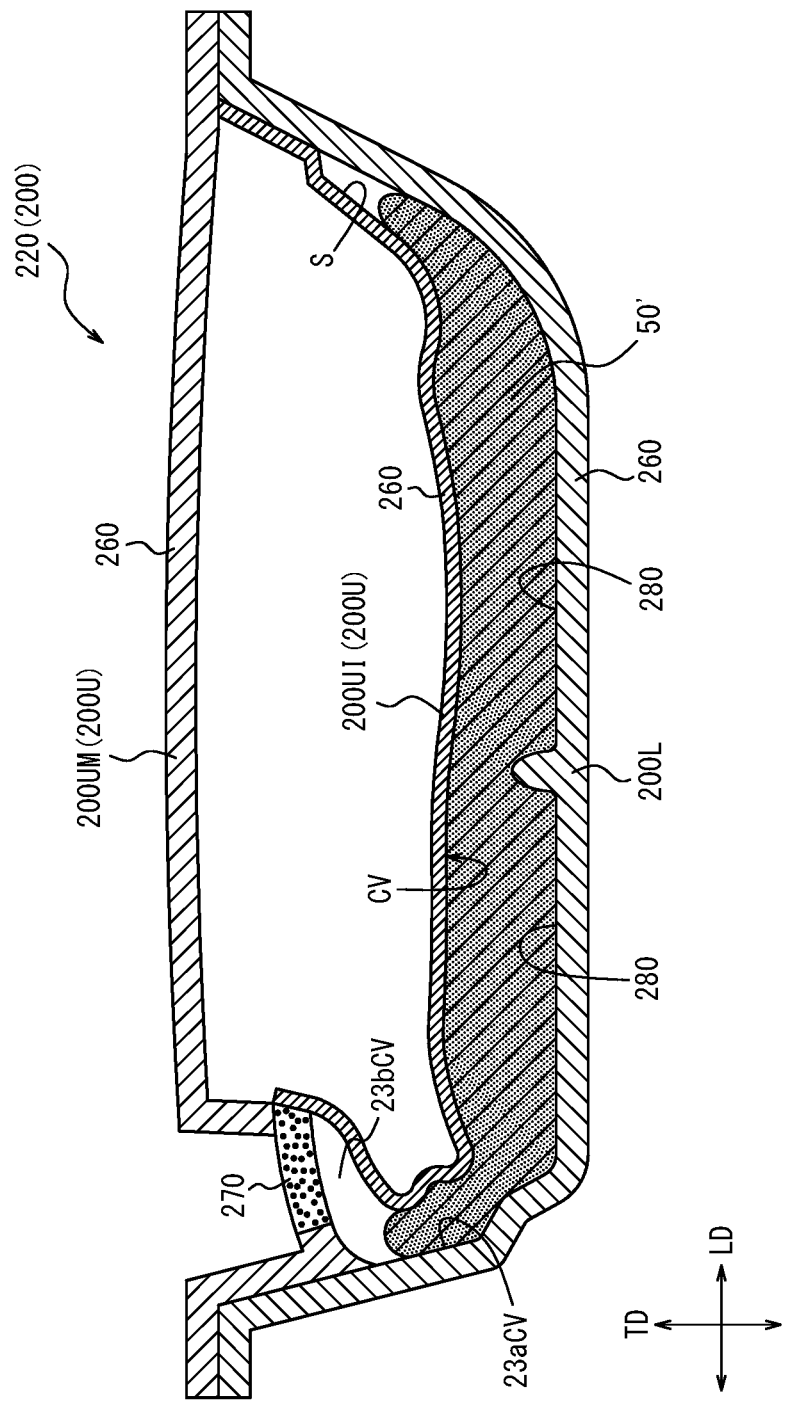
FIG. 7 illustrates the foam molding step in the method of manufacturing a resin foam body according to the embodiment of the present disclosure, and it depicts a state in the mold of FIG. 1 in which the cavity is being filled with the foamable resin material.
Figure 8:
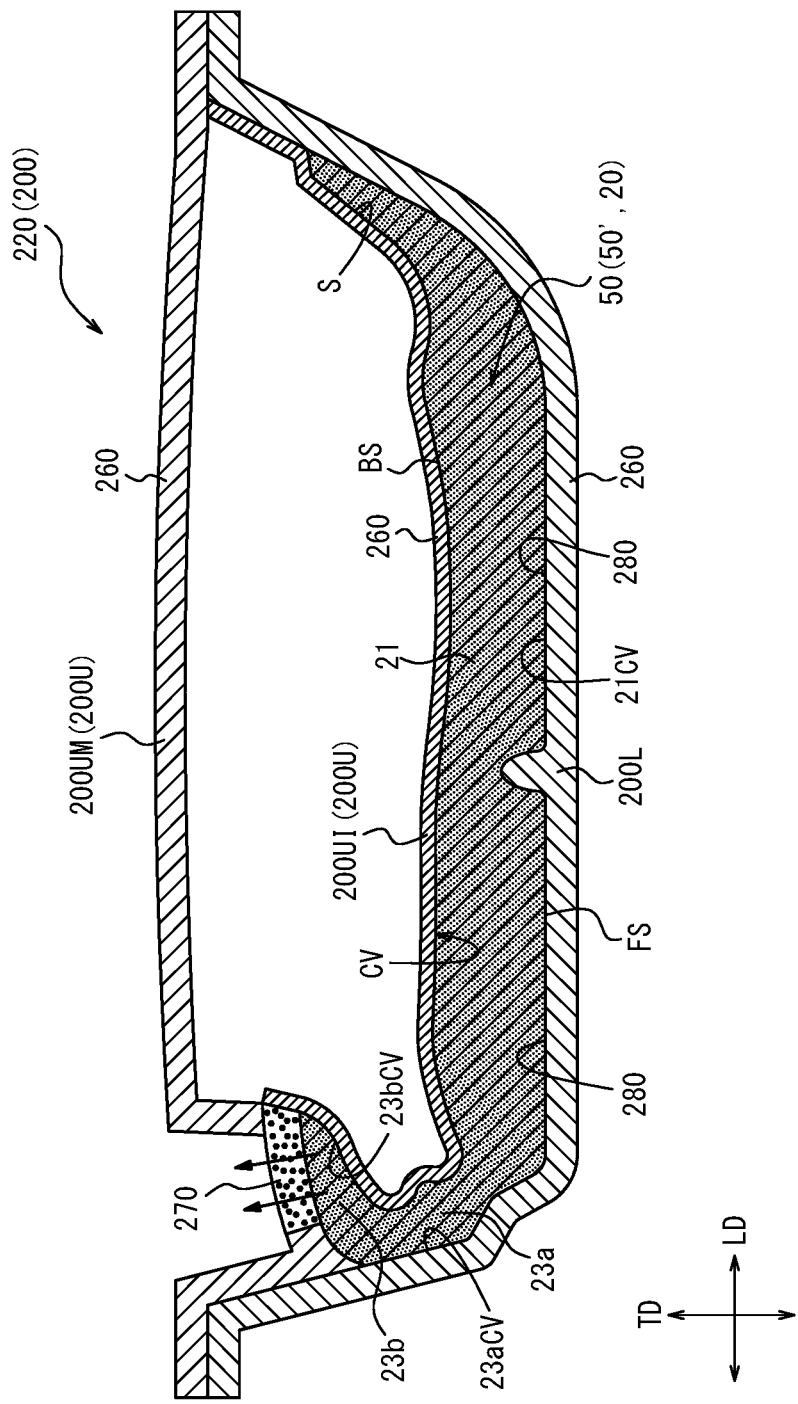
FIG. 8 illustrates the foam molding step in the method of manufacturing a resin foam body according to the embodiment of the present disclosure, and it depicts a state in the mold of FIG. 1 in which the cavity has been filled with the foamable resin material.

Next, in the foam molding step, a foamable resin material 50' is arranged at a predetermined arrangement position 280 in the cavity CV of the mold 200, the mold 200 is closed, and a resin foam body 50 is foam molded (FIG. 6 to FIG. 8). The foamable resin material 50' is in a liquid form.

FIG. 6 illustrates a state immediately after the foamable resin material 50' is arranged at the predetermined arrangement position 280 and the mold 200 is closed. FIG. 7 illustrates a state in which the cavity CV is being filled with the foamable resin material 50'. FIG. 8 illustrates a state in which the cavity CV has been filled with the foamable resin material 50'.

The predetermined arrangement position 280 is a predetermined position at which the foamable resin material 50' is to be arranged. In the examples of FIG. 1 to FIG. 8, the predetermined arrangement position 280 corresponds to part of the molding surface S of the lower mold 200L that faces the middle portion in the left and right direction of the main pad molding cavity 21CV and part of the molding surface S of the lower mold 200L that faces part of the pair of side pad molding cavities 22CV (FIG. 2 and FIG. 6). In the examples of FIG. 9 to FIG. 11, the predetermined arrangement position 280 corresponds to part of the molding surface S of the lower mold 200L that faces the middle portion in the left and right direction of the main pad molding cavity 11CV and part of the molding surface S of the lower mold 200L that faces part of the pair of side pad molding cavities 12CV (FIG. 9 and FIG. 10). The predetermined arrangement position 280 may, however, be any position in the cavity CV of the mold 200. There may be only one or several predetermined arrangement positions 280. The predetermined arrangement position 280 is preferably located on at least part of the molding surface S of the lower mold 200L, because this makes it easy to arrange the foamable resin material 50'.

The foamable resin material 50' arranged at the predetermined arrangement position 280 gradually expands and starts to fill the cavity CV, and then is molded into the resin foam body 50 having a shape corresponding to the cavity CV (FIG. 7 and FIG. 8).

In the foam molding step, gases in the cavity CV (a gas present in the cavity CV and a gas generated by the reaction of the foamable resin material 50') are released to the outside of the mold 200 through the degassing tool 270 (FIG. 8). This can prevent excess bubbles from remaining in the resin foam body 50, and thus preventing the occurrence of defects, such as insufficient filling, in the resin foam body 50.

After the foam molding step, the mold 200 is opened, and the resin foam body 50 is removed so as to obtain the resin foam body 50.

Additionally, the mold release agent application step may be omitted.

In each embodiment described herein, as described above, the degassing tool 270 is formed of porous metal, and the surface 270a of the degassing tool 270 that is on the side of the cavity CV forms part of the molding surface S of the mold 200. Thus, because the degassing tool 270 has a simple structure, compared to a case in which a degassing tool has a complex structure as in PTL 1, the risk of the foamable resin material 50' being trapped or entering the degassing tool 270 during foam molding can be reduced, and thus, the time required for maintenance of the degassing tool 270 can be reduced, and the defective rate of resin foam bodies 50 can be reduced.

According to each embodiment described herein, since the degassing tool 270 is formed of porous metal, the entire surface 270a on the side of the cavity CV has the function of releasing gases in the cavity CV to the outside of the mold 200. Accordingly, compared to a case in which only part of a degassing tool provides the function of releasing gases in the cavity CV to the outside of the mold 200 as in PTL 1, it can be further ensured that excess bubbles are prevented from remaining in the resin foam body 50, and thus, the occurrence of defects, such as insufficient filling, in the resin foam body 50 can be prevented. Additionally, in the degassing tool according to PTL 1, only an outer peripheral part of an opening and closing portion facing a cavity provides the function of releasing gases in the cavity to the outside of the mold, and part thereof directly below the opening and closing portion does not have the function of releasing gases in the cavity to the outside of the mold, so there is a possibility that excess bubbles may remain in a resin foam body.

According to each embodiment described herein, since the degassing tool 270 is formed of porous metal, and the surface 270a of the degassing tool 270 that is on the side of the cavity CV forms part of the molding surface S of the mold 200, the surface 270a of the degassing tool 270 that is on the side of the cavity CV can be formed in any surface shape (e.g., curved surface shape) and can more smoothly follow the surface shape (design shape) of a desired resin foam body 50. In this regard, in PTL 1, the opening and closing portion of the degassing tool has a flat plate shape, and it is difficult to follow the surface shape (design shape) of a desired resin foam body, so that marks of the opening and closing portion may be left on the resin foam body.

According to each embodiment described herein, since the degassing tool 270 is formed of metal, clogging, softening, or the like of the degassing tool 270 due to erosion of the degassing tool 270 by, for example, a solvent-based mold release agent 60 can be better prevented, compared to a case in which the degassing tool 270 is formed of resin or the like. Furthermore, since the degassing tool 270 is formed of metal, the difference in thermal expansion coefficient between the mold body portion 260 and the degassing tool 270 can be reduced. This in turn prevents a gap from forming between the mold body portion 260 and the degassing tool 270 during foam molding, thereby preventing the foamable resin material 50' from leaking out of the mold 200 from the gap. Moreover, since the degassing tool 270 is formed of metal, it is easier to maintain a uniform temperature of the mold 200, which in turn makes it easier to make the density distribution of the resin foam body 50 uniform. Moreover, since the degassing tool 270 is formed of metal, the surface conditions (skin, or apparent shininess, surface air permeability, or the like.) of a surface portion of the resin foam body 50 molded by the surface 270a of the degassing tool 270 that is on the side of the cavity CV and the surface conditions of a surface portion of the resin foam body 50 molded by the molding surface S of the mold body portion 260 can be made the same.

In the following, preferable configurations of the mold 200 and modifications will be described. Regarding each of the configurations described below, in a case in which the mold 200 includes a plurality of degassing tools 270, only some (one or more) of the degassing tools 270 may satisfy the configuration, or all of the degassing tools 270 may satisfy the configuration.

In each embodiment described herein, preferably, there is no step between the surface 270a of the degassing tool 270 that is on the side of the cavity CV and part of the mold body portion 260 that is adjacent to the degassing tool 270, as in the examples of FIG. 1 and FIG. 9. This prevents marks of the degassing tool 270 from remaining on the resin foam body 50.

In each embodiment described herein, the degassing tool 270 (specifically, the cell holes 272 of the degassing tool 270) is preferably configured to allow gases in the cavity CV, but not the foamable resin material 50' arranged in the cavity CV, to pass therethrough. This can prevent the foamable resin material 50' from entering the cell holes 272 of the degassing tool 270 during foam molding, and thus, the time required for maintenance of the degassing tool 270 can be reduced, and the defective rate of resin foam bodies 50 can be reduced.

In each embodiment described herein, the degassing tool 270 may be formed of any metal. For example, the degassing tool 270 is preferably formed of metal that is composed mainly of, for example, iron, aluminum, or nickel. In this case, the difference in thermal expansion coefficient between the mold body portion 260 and the degassing tool 270 can be further reduced. This in turn more effectively prevents a gap from forming between the mold body portion 260 and the degassing tool 270 during foam molding.

In this case, it is preferable for the mold body portion 260 to be formed of metal that is composed mainly of aluminum or iron.

Examples of metal that is composed mainly of iron include iron, stainless steel, and maraging steel. Examples of metal that is composed mainly of aluminum include aluminum and aluminum alloy. Examples of metal that is composed mainly of nickel include nickel and nickel alloy.

In each embodiment described herein, the difference in linear expansion coefficient between the metal of which the mold body portion 260 is formed and the metal of which the degassing tool 270 is formed is preferably $15 \times 10^{-6}$/K or less, and more preferably $12 \times 10^{-6}$/K or less.

This more effectively prevents a gap from forming between the mold body portion 260 and the degassing tool 270 during foam molding.

The linear expansion coefficient of the metal is measured in accordance with JIS Z 2285:2003.

In each embodiment described herein, at least part of the degassing tool 270 preferably extends over the entirety in a thickness direction of the mold 200, as in the examples of FIG. 1 and FIG. 9. This allows the degassing tool 270 to effectively release gases in the cavity CV to the outside of the mold 200.

However, the degassing tool 270 may have its one side opposite to the cavity CV covered by the mold body portion 260. In that case, part of the mold body portion 260 that covers the degassing tool 270 may be provided with one or more vent holes that penetrate the part in the thickness direction of the mold 200. In this case, gases in the cavity CV are released to the outside of the mold 200 through the vent holes after passing through the degassing tool 270.

Additionally, the mold body portion 260 may include one or more vent holes that penetrate the mold 200 in the thickness direction in positions at a distance from the degassing tool 270.

In each embodiment described herein, the degassing tool 270 is preferably arranged at a distance from the predetermined arrangement position 280 of the foamable resin material 50', as in the examples of FIG. 1 through FIG. 11. During foam molding, the foamable resin material 50' starts to fill the cavity CV while gradually expanding, but as it progresses further away from the predetermined arrangement position 280, it takes longer to fill and a large number of bubbles tend to be entrapped. By arranging the degassing tool 270 in a position at a distance from the predetermined arrangement position 280 where such bubbles are likely to form, these excess bubbles can be effectively removed by the degassing tool 270. It is therefore possible to effectively prevent excess bubbles from remaining in the resin foam body 50.

In each embodiment described herein, in a case in which the mold 200 includes the upper mold 200U and the lower mold 200L, as in the examples of FIG. 1 through FIG. 11, it is preferable for the degassing tool 270 to form part of the upper mold 200U. In this case, the predetermined arrangement position 280 of the foamable resin material 50' is preferably in at least part of the molding surface S of the lower mold 200L. In this case, during foam molding, the foamable resin material 50' gradually expands, and filling starts from the molding surface S of the lower mold 200L and progresses toward the upper side, but as it progresses further away from the predetermined arrangement position 280 (and thus closer to the upper side), it takes longer to fill and a large number of bubbles tend to be entrapped. By arranging the degassing tool 270 at an upper position where such bubbles are likely to form, these excess bubbles can be effectively removed by the degassing tool 270. It is therefore possible to effectively prevent excess bubbles from remaining in the resin foam body 50.

In a case in which the upper mold 200U includes the upper mold body portion 200UM and the core 200UI, as in the examples of FIG. 1 and FIG. 2, the degassing tool 270 may form part of the upper mold body portion 200UM and/or the core 200UI.

As described above, however, the degassing tool 270 may form any part of the mold 200. Furthermore, the mold 200 may have any configuration, without being limited to the configuration with the upper mold 200U and the lower mold 200L.

In each embodiment described herein, as in the examples of FIG. 1 to FIG. 8, it is preferable for the degassing tool 270 to face a position in the cavity CV (in the examples of FIG. 1 to FIG. 8, the upper back portion molding cavity 23bCV) where the foamable resin material 50', which is arranged at the predetermined arrangement position 280 in the cavity CV, reaches last. By thus arranging the degassing tool 270 at a position farthest from the predetermined arrangement position 280 where bubbles are most likely to form, excess bubbles can be effectively removed by the degassing tool 270. It is therefore possible to effectively prevent excess bubbles from remaining in the resin foam body 50.

In each embodiment described herein, it is preferable for the degassing tool 270 to be manufactured using a 3D printer. Although the powder sintering method is preferably used as a shaping method using a 3D printer, other methods may be employed. The powder sintering method is based on sintering of metal powders by irradiating them with a laser beam.

By manufacturing the degassing tool 270 using a 3D printer, the porous structure of the degassing tool 270 can be easily obtained as desired, and a desired degassing function can be achieved.

In each embodiment described herein, the degassing tool 270 may have any porous structure. For example, the degassing tool 270 may be configured in a grid form, as in the example of FIG. 3. In this case, the cell holes 272 of the degassing tool 270 are regularly arranged, specifically, arranged with equal spacing along two mutually orthogonal directions. Alternatively, the cell holes 272 of the degassing tool 270 may be randomly arranged.

The cell holes 272 of the degassing tool 270 preferably have a substantially uniform diameter. The cell holes 272 of the degassing tool 270 preferably have a substantially uniform shape.

In each embodiment described herein, from the viewpoint of improving the degassing function, the surface 270a of the degassing tool 270 that is on the side of the cavity CV has an area of preferably 9 cm² or more, and preferably 25 cm² or more. The surface 270a of the degassing tool 270 that is on the side of the cavity CV has an area of preferably 150 cm² or less, and preferably 110 cm² or less.

INDUSTRIAL APPLICABILITY

The mold, the degassing tool, and the method of manufacturing a resin foam body are suitable for use in molding any resin foam body, and are more suitable for use in molding a resin foam body made of flexible resin. For example, they are suitable for use in molding a seat pad (in particular, a vehicle seat pad).

REFERENCE SIGNS LIST

200 Mold
200L Lower mold
LS Molding surface of lower mold
200U Upper mold
US Molding surface of upper mold
200UM Upper mold body portion
200UI Core
S Molding surface
CV Cavity
210 Cushion pad molding mold
11CV Main pad molding cavity
11tCV Under-thigh portion molding cavity
11hCV Under-hip portion molding cavity
12CV Side pad molding cavity
13CV Back pad facing portion molding cavity
220 Back pad molding mold
21CV Main pad molding cavity
22CV Side pad molding cavity
23aCV Upper bridge portion molding cavity
23bCV Upper back portion molding cavity
24aCV Side bridge portion molding cavity
24bCV Side back portion molding cavity
260 Mold body portion
270 Degassing tool
270a Surface that is on the side of cavity
271 Skeleton portion
272 Cell hole
280 Predetermined arrangement position
50 Resin foam body
50' Foamable resin material
60 Mold release agent
1 Seat pad
10 Cushion pad
11 Main pad (seated portion)
11t Under-thigh portion
11h Under-hip portion
12 Side pad
13 Back pad facing portion
20 Back pad
21 Main pad
22 Side pad
23a Upper bridge portion
23b Upper back portion
24a Side bridge portion
24b Side back portion
24bb Lower end
40 Headrest
100 Vehicle seat
TD Thickness direction
LD Direction of extension
FS Surface on seated person's side (front surface)
BS Back surface

The invention claimed is:
1. A mold comprising:
a mold body portion; and
a degassing tool attached to the mold body portion, wherein
the degassing tool is formed of porous metal, a surface of the degassing tool that is on a side of a cavity of the mold forms part of a molding surface of the mold, and a mold release agent is permeated through the degassing tool and applied to the surface of the degassing tool that is on the side of the cavity.

2. The mold according to claim 1, wherein the degassing tool is formed of metal that is composed mainly of iron, aluminum, or nickel.

3. The mold according to claim 1, wherein a difference in linear expansion coefficient between a metal of which the mold body portion is formed and a metal of which the degassing tool is formed is $15 \times 10^{-6}$/K or less.

4. The mold according to claim 1, wherein the degassing tool extends over an entirety in a thickness direction of the mold.

5. The mold according to claim 1, comprising:
an upper mold; and
a lower mold arranged below the upper mold, wherein
the degassing tool forms part of the upper mold, and
the mold body portion forms the upper mold except for the part and the lower mold.

6. The mold according to claim 1, wherein the degassing tool faces a position in the cavity where a foamable resin material arranged at a predetermined arrangement position in the cavity of the mold reaches last.

7. The mold according to claim 1, wherein the mold is configured to mold a resin foam body made of polyurethane foam.

8. The mold according to claim 1, wherein the mold is configured to mold a seat pad.

9. The mold according to claim 1, wherein the degassing tool is configured to allow gas in the cavity, but not a foamable resin material arranged in the cavity of the mold, to pass therethrough.

10. The mold according to claim 1, wherein the degassing tool is a 3D printed object.

11. The mold according to claim 1, wherein the degassing tool is configured in a grid form.

12. The mold according to claim 2, wherein a difference in linear expansion coefficient between a metal of which the mold body portion is formed and a metal of which the degassing tool is formed is $15 \times 10^{-6}$/K or less.

13. The mold according to claim 2, wherein the degassing tool extends over an entirety in a thickness direction of the mold.

14. The mold according to claim 3, wherein the degassing tool extends over an entirety in a thickness direction of the mold.

15. The mold according to claim 2, comprising:
an upper mold; and
a lower mold arranged below the upper mold, wherein
the degassing tool forms part of the upper mold, and
the mold body portion forms the upper mold except for the part and the lower mold.

16. The mold according to claim 3, comprising:
an upper mold; and
a lower mold arranged below the upper mold, wherein
the degassing tool forms part of the upper mold, and
the mold body portion forms the upper mold except for the part and the lower mold.

17. A method of manufacturing a resin foam body using the mold according to claim 1, the method comprising:
a foam molding step of foam molding a resin foam body, by arranging a foamable resin material at a predetermined arrangement position in a cavity of the mold and closing the mold; and
a mold release agent application step, performed before the foam molding step, of applying a mold release agent to a molding surface of the mold, wherein
in the foam molding step, gas in the cavity is released to outside of the mold through the degassing tool, and
in the mold release agent application step, the mold release agent is allowed to permeate the degassing tool from outside the mold and reach a surface of the degassing tool that is on a side of the cavity.

18. The method according to claim 17, wherein the degassing tool faces a position in the cavity where the foamable resin material arranged at the predetermined arrangement position in the foam molding step reaches last.

* * * * *